(12) United States Patent
Kreider et al.

(10) Patent No.: US 11,132,003 B2
(45) Date of Patent: Sep. 28, 2021

(54) INTEGRATED GNSS AND STEERING FOR AGRICULTURAL GUIDANCE SYSTEMS

(71) Applicant: AgJunction LLC, Scottsdale, AZ (US)

(72) Inventors: Thomas R. Kreider, Peoria, AZ (US); Mark Alan Villela, Glendale, AZ (US); Michael Brett McMickell, Scottsdale, AZ (US)

(73) Assignee: AGJUNCTION LLC, Scottsdale, AZ (US)

( * ) Notice: Subject to any disclaimer, the term of this patent is extended or adjusted under 35 U.S.C. 154(b) by 142 days.

(21) Appl. No.: 16/569,569

(22) Filed: Sep. 12, 2019

(65) Prior Publication Data

US 2020/0089256 A1 Mar. 19, 2020

Related U.S. Application Data

(60) Provisional application No. 62/731,675, filed on Sep. 14, 2018.

(51) Int. Cl.
*G05D 1/02* (2020.01)
*G01C 21/16* (2006.01)
*B62D 6/00* (2006.01)

(52) U.S. Cl.
CPC ............ *G05D 1/0278* (2013.01); *B62D 6/00* (2013.01); *G01C 21/165* (2013.01); *G05D 1/027* (2013.01); *G05D 2201/0201* (2013.01)

(58) Field of Classification Search
CPC ............ G05D 1/027; G05D 1/0278; G05D 2201/0201; B62D 6/00; G01C 21/165
See application file for complete search history.

(56) References Cited

U.S. PATENT DOCUMENTS

| 5,194,851 A | 3/1993 | Kraning et al. |
| 5,390,125 A | 2/1995 | Sennott et al. |

(Continued)

FOREIGN PATENT DOCUMENTS

WO WO 2009/008954 A2 1/2009

OTHER PUBLICATIONS

Noh, Kwang-Mo, Self-tuning controller for farm tractor guidance, Iowa State University Retrospective Theses and Dissertations, Paper 9874, (1990).

(Continued)

*Primary Examiner* — Tan Q Nguyen
(74) *Attorney, Agent, or Firm* — Schwabe Williamson & Wyatt

(57) ABSTRACT

An integrated computing system computes a geo-location of a vehicle based on location data generated by a GNSS receiver, operates one or more external communication interfaces, calculates a desired path for steering the vehicle based on the geo-location, and communicates the desired path to one or more external operating units via the one or more external communication interfaces. The integrated computing system may include one or more computer processing units programmed to provide shared coordinated execution of software functions that are all implemented and located within a same integrated circuit or enclosure. The integrated computing system lowers the overall cost and complexity of agricultural guidance systems by reducing and simplifying the number of chassis, boxes, connectors, power supplies, and manufacturing processes.

6 Claims, 3 Drawing Sheets

(56) References Cited

U.S. PATENT DOCUMENTS

| | | |
|---|---|---|
| 5,663,879 A | 9/1997 | Trovato et al. |
| 5,923,270 A | 7/1999 | Sampo et al. |
| 6,052,647 A | 4/2000 | Parkinsonetai. |
| 6,070,673 A | 6/2000 | Wendte |
| 6,212,453 B1 | 4/2001 | Kawagoe et al. |
| 6,373,432 B1 | 4/2002 | Rabinowitz et al. |
| 6,377,889 B1 | 4/2002 | Soest |
| 6,445,983 B1 | 9/2002 | Dickson et al. |
| 6,539,303 B2 | 3/2003 | McClure et al. |
| 6,711,501 B2 | 3/2004 | McClure et al. |
| 6,789,014 B1 | 9/2004 | Rekow et al. |
| 6,819,780 B2 | 11/2004 | Benson et al. |
| 6,865,465 B2 | 3/2005 | McClure |
| 6,876,920 B1 | 4/2005 | Mailer |
| 7,142,956 B2 | 11/2006 | Heiniger et al. |
| 7,162,348 B2 | 1/2007 | McClure et al. |
| 7,277,792 B2 | 10/2007 | Overschie |
| 7,373,231 B2 | 5/2008 | McClure et al. |
| 7,400,956 B1 | 7/2008 | Feller et al. |
| 7,437,230 B2 | 10/2008 | McClure |
| 7,460,942 B2 | 12/2008 | Mailer |
| 7,596,451 B2 * | 9/2009 | Stoller ............... B62D 1/28 180/168 |
| 7,689,354 B2 | 3/2010 | Heiniger et al. |
| RE41,358 E | 5/2010 | Heiniger et al. |
| 7,835,832 B2 | 11/2010 | Macdonald et al. |
| 7,885,745 B2 | 2/2011 | McClure et al. |
| 8,018,376 B2 | 9/2011 | McClure et al. |
| 8,190,337 B2 | 5/2012 | McClure |
| 8,214,111 B2 | 7/2012 | Heiniger et al. |
| 8,311,696 B2 | 11/2012 | Reeve |
| 8,386,129 B2 | 2/2013 | Collins et al. |
| 8,401,704 B2 | 3/2013 | Pollock et al. |
| 8,489,291 B2 | 7/2013 | Dearborn et al. |
| 8,521,372 B2 | 8/2013 | Hunt et al. |
| 8,548,649 B2 | 10/2013 | Guyette et al. |
| 8,583,315 B2 | 11/2013 | Whitehead et al. |
| 8,583,326 B2 | 11/2013 | Collins et al. |
| 8,589,013 B2 | 11/2013 | Pieper et al. |
| 8,594,879 B2 | 11/2013 | Roberge et al. |
| 8,634,993 B2 | 1/2014 | McClure et al. |
| 8,639,416 B2 | 1/2014 | Jones et al. |
| 8,649,930 B2 * | 2/2014 | Reeve ............... B62D 1/28 701/24 |
| 8,676,620 B2 | 3/2014 | Hunt et al. |
| 8,718,874 B2 | 5/2014 | McClure et al. |
| 8,768,558 B2 | 7/2014 | Reeve et al. |
| 8,781,685 B2 * | 7/2014 | McClure ............ A01B 69/008 701/41 |
| 8,803,735 B2 | 8/2014 | McClure |
| 8,897,973 B2 | 11/2014 | Hunt et al. |
| 8,924,152 B2 | 12/2014 | Hunt et al. |
| 9,002,565 B2 * | 4/2015 | Jones ............... G05D 1/027 701/23 |
| 9,002,566 B2 | 4/2015 | McClure et al. |
| 9,141,111 B2 | 9/2015 | Webber et al. |
| 9,162,703 B2 | 10/2015 | Miller et al. |
| 9,173,337 B2 | 11/2015 | Guyette et al. |
| 9,223,314 B2 | 12/2015 | McClure et al. |
| 9,255,992 B2 | 2/2016 | McClure |
| 9,389,615 B2 | 7/2016 | Webber et al. |
| 10,093,355 B1 * | 10/2018 | Wang ............... E02F 9/2045 |
| 10,890,915 B2 * | 1/2021 | Pedersen ............ G05D 1/0044 |
| 2002/0072850 A1 | 6/2002 | McClure et al. |
| 2004/0186644 A1 | 9/2004 | McClure et al. |
| 2006/0167600 A1 | 7/2006 | Nelson, Jr. et al. |
| 2010/0274452 A1 | 10/2010 | Ringwald et al. |
| 2011/0231061 A1 | 9/2011 | Reeve et al. |
| 2014/0266877 A1 | 9/2014 | McClure |
| 2014/0277676 A1 | 9/2014 | Gattis |
| 2015/0175194 A1 | 6/2015 | Gattis |
| 2016/0039454 A1 | 2/2016 | Mortimer |
| 2016/0154108 A1 | 6/2016 | McClure et al. |
| 2016/0205864 A1 | 7/2016 | Gattis et al. |
| 2016/0214643 A1 | 7/2016 | Joughin et al. |
| 2016/0252909 A1 | 9/2016 | Webber et al. |
| 2016/0334804 A1 | 11/2016 | Webber et al. |
| 2018/0088590 A1 * | 3/2018 | Zhu ............... B62D 15/0265 |

OTHER PUBLICATIONS

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

International Preliminary Report on Patentability; PCT/US2019/050899; dated Mar. 25, 2021, pp. 1-7.

International Search Report and Written Opinion; PCT/US2019/050899; dated Dec. 20, 2019, pp. 1-13.

* cited by examiner

INTEGRATED GNSS AND STEERING FOR AGRICULTURAL GUIDANCE SYSTEMS

The present application claims priority to U.S. Provisional Patent Application Ser. No. 62/731,675, filed on Sep. 14, 2018 which is incorporated by reference in its entirety.

BACKGROUND

Cost of a precision farming guidance system is driven in part by the number of discrete chassis and circuit boards in the system where each chassis hold electronics that provide functions such as processing, acceleration/rotation sensors, GPS/GNSS, steering actuators, etc. Each additional chassis increases the number of boxes, connectors, power supplies, manufacturing processes, etc., increasing the complexity and overall cost of the guidance system.

The disclosure that follows solves this and other problems.

SUMMARY

A precision integrated agriculture guidance system includes a single processor hardware device packaged with sensors, network interfaces, and Global Navigation Satellite System (GNSS) front-end radio frequency conditioning. This configuration of hardware and software leverages the spare processing power of GPS/GNSS processors to host the steering algorithm, Inertial Measurement Unit (IMU) conditioning, and user and network interfaces.

In one embodiment, an integrated computing system is located on a vehicle and includes one or more computer processing units and one or more Global Navigation Satellite System (GNSS) radio-frequency receivers coupled to the computer processing units and configured to generate location data. Memory is coupled to the computer processing units and stores instructions that, when executed by the computer processing units, cause the computer processing units to compute a geo-location of the vehicle based on the location data generated by the GNSS receivers, operate one or more external communication interfaces, calculate a desired path for steering the vehicle based on the geo-location of the vehicle, and communicate the desired path to one or more operating units located external from the integrated computing system via the one or more external communication interfaces.

In one embodiment, the one or more computer processing units are coupled together and programmed to provide shared coordinated execution of the software functions. In one embodiment, the computer processing units, GNSS radio-frequency receivers, and memory are all located within a same integrated circuit or enclosure.

In one embodiment, the computer processing units may comprise one or more Field Programmable Gate Arrays (FPGA) or other programmable logic devices. In another embodiment, the computer processing units may comprise one or more Application Specific Integrated Circuits (ASICs). In another embodiment, the computer processing units may comprise one or more custom integrated circuits.

In one embodiment, the one or more external communication interfaces may include a Controller Area Network (CAN) interface. In another embodiment, the one or more external communication interfaces may include an Ethernet network interface.

In one embodiment, the memory may store a predetermined path for the vehicle and the one or more computing processing units may steer the vehicle along the desired path based on the predetermined path. In another embodiment, the one or more computer processing units may receive a predetermined path over one of the external communication interfaces from an external computing system and steer the vehicle along the desired path based on the receive predetermined path.

In another embodiment, the one or more computer processing units may calculate steering commands based on the calculated desired path, and send the steering commands to a steering controller over one of the external communication interfaces to steer the vehicle along the desired path.

In one embodiment, an integrated vehicle guidance unit, comprises a vehicle steering interface configured to communicate with a steering actuator, an inertial measurement unit (IMU), a global navigation satellite system (GNSS) receiver configured to receive position data from a GNSS radio antenna, a network interface configured to communicate with a computer terminal, and an integrated guidance central processing unit (GCPU) coupled to the vehicle steering interface, inertial measurement unit, GNSS receiver, and network interface.

In one embodiment, a memory device is coupled to, or incorporated within, the GCPU and includes instructions stored thereon that, in response to execution by the GCPU, cause the GCPU to operate software functions. The software functions may include a steering controller configured to control and exchange data with the steering actuator through the vehicle steering interface, an IMU controller configured to control and exchange data with the IMU, a GNSS controller configured to control and exchange data with the GNSS receiver, an external interface configured to exchange data with the computer terminal through the network interface, and a guidance controller configured to control and exchange data with the steering controller, IMU controller, GNSS controller, and external interface.

In one embodiment, the software functions include a real-time operating system configured to control operation of the guidance controller, the steering controller, IMU controller, the GNSS controller, and the external interface. In one embodiment, the GCPU, vehicle steering interface, inertial measurement unit, GNSS receiver, and network interface are all located within a same housing or integrated circuit.

In one embodiment, the GCPU comprises one or more Field Programmable Gate Arrays (FPGA) or other programmable logic devices. In another embodiment the GCPU comprises one or more Application Specific Integrated Circuits (ASICs). In another embodiment, the GCPU comprises a custom integrated circuit.

In one embodiment, a guidance central processing unit for steering a vehicle includes a hardware processor and a memory device coupled to the hardware processor including instructions stored thereon that, in response to execution by the hardware processor, cause the hardware processor operate software functions. The software functions may include a steering controller configured to control a vehicle steering interface, the vehicle steering interface configured to communicate with a steering actuator; an inertial measurement unit (IMU) controller configured to control an IMU, and a global navigation satellite system (GNSS) controller configured to control a GNSS receiver. The GNSS receiver may be configured to receive position data from a GNSS radio antenna.

The software functions also may include an external network interface configured to communicate over a network with external components located on the vehicle, and a main guidance controller configured to steer the vehicle based on data exchanged with the steering controller, IMU controller, GNSS controller, and external network interface.

In one embodiment, the hardware processor, memory device, vehicle steering interface, IMU, GNSS receiver, and external network interface are all located within a same integrated circuit. In one embodiment, the software functions may include a real-time operating system configured to control operation of the main guidance controller, steering controller, IMU controller, GNSS controller, and external network interface.

Additional aspects and advantages will be apparent from the following detailed description of preferred embodiments, which proceeds with reference to the accompanying drawings.

DETAILED DESCRIPTION

Figure 1:
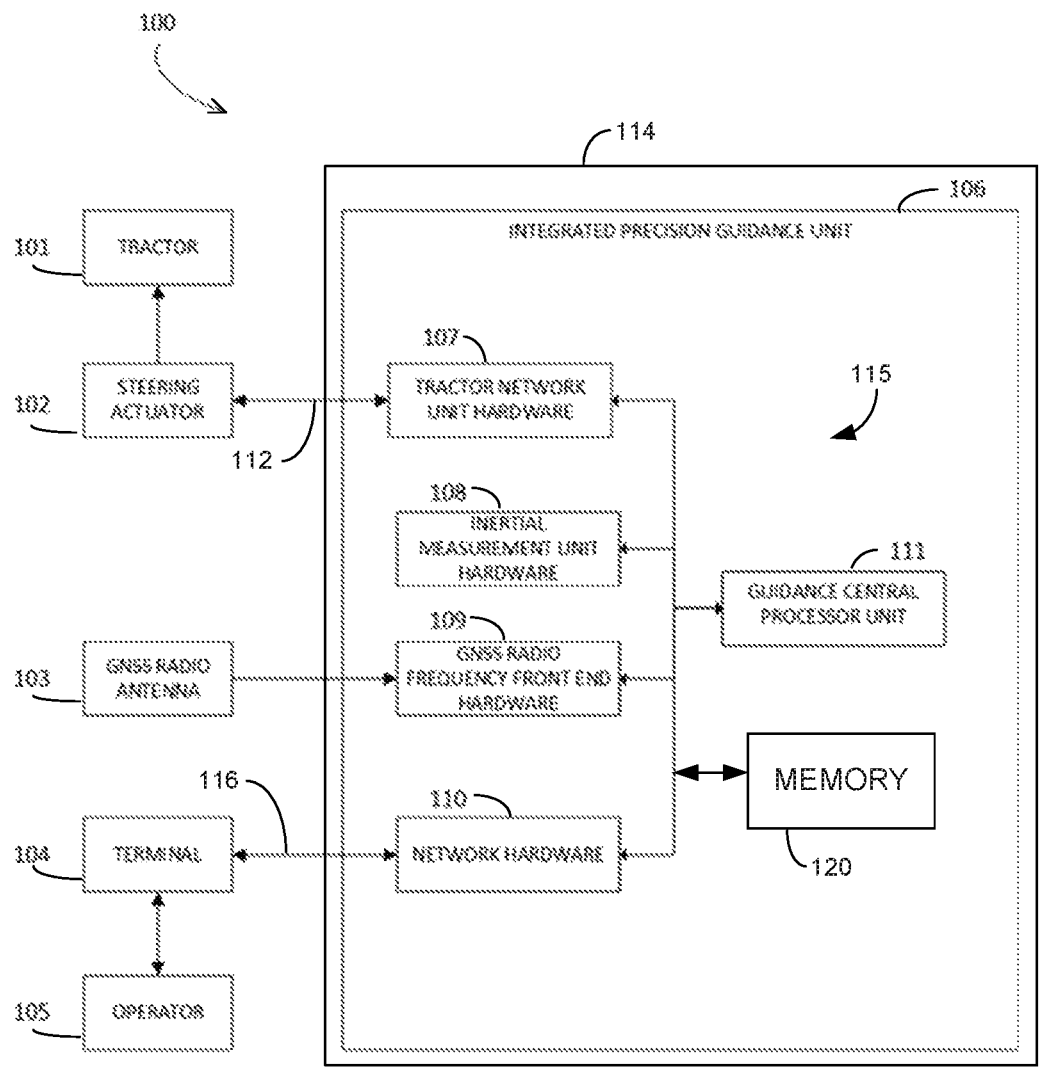
FIG. 1 illustrates the hardware of an integrated computer guidance system that integrates GNSS and steering command functions for lower cost precision agricultural guidance.

FIG. 1 illustrates an integrated computer guidance system 100 that integrates GNSS and steering command functions for a lower cost, precision agricultural guidance. A vehicle operator 105 uses integrated computing system 100 installed in a vehicle 101, such as a tractor, to steer the vehicle through a field to do work, examples including plowing, seeding, spraying, and harvesting. However, system 100 may be used in any vehicle that may want to integrate sensor and steering control processing.

Figure 2:
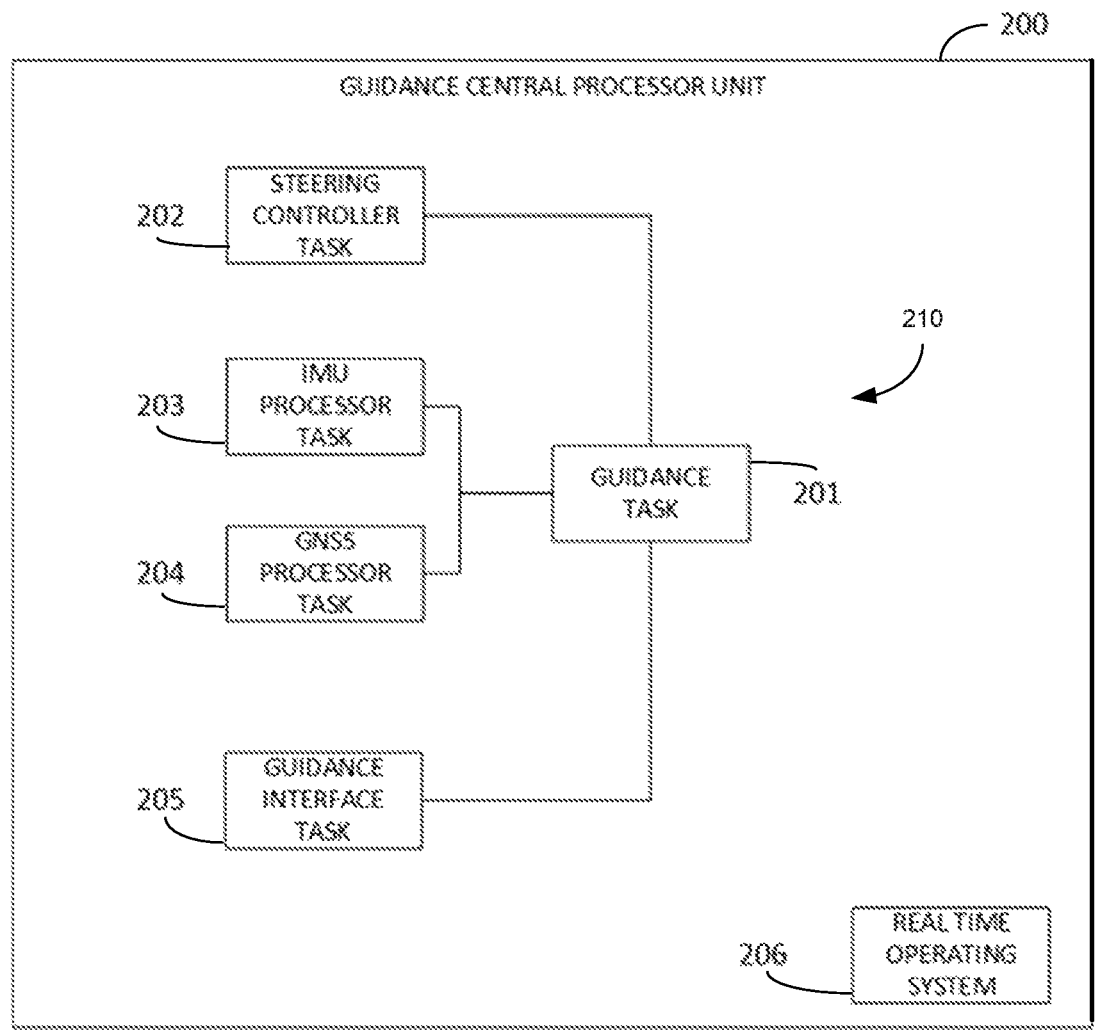
FIG. 2 illustrates the software tasks that operate within a central processing unit of the integrated computer guidance system of FIG. 1.

An integrated precision guidance unit 106 uses a single hardware central processing unit 111 shown in FIG. 1 and 200 shown in FIG. 2 to operate all guidance related software 201, 202, 203, 204, 205, and 206. The use of a single integrated guidance unit central processing unit 111 saves cost over using a federated approach with each software function 201-205 housed in a separate chassis and running separate processors with dedicated network interfaces and power conditioning.

The integrated precision guidance unit 106 houses guidance central processing unit 111 in a common enclosure and/or common integrated circuit 114 with supporting electronics hardware 107, 108, 109, and 110. An external interface 112 is connected to a steering actuator 102 that turns tractor 101 under computerized software control operations 202 and 201. An external interface 116 is connected to a computer terminal 104 through a computer network and is used to interact with an operator 105.

Terminal 104 may comprise a dedicated navigation interface computer operating on vehicle 101 or may be a general purpose personal computer (PC), laptop computer, smart phone, tablet, or any other smart handheld device. In another example, computer terminal 104 may be a central server that is accessed by operator 105 and central processor unit 111 via a wide area network (WAN).

The integrated computing system 100 uses a geo-location sensor that communicates with a space-based Global Navigation Satellite System (GNSS) to locate tractor 101. Two main hardware elements of the GNSS receiver sensor include a GNSS radio antenna 103 and a GNSS radio frequency receiver and digitizer 109 (GNSS radio frequency front end hardware). The GNSS digitizer 109 inputs GNSS data to GNSS processor task software 204 that then extracts the GNSS signal and derives the associated location data from signals received from a GNSS constellation.

The integrated computing system 100 also uses inertial measurement unit (IMU) hardware 108 to detect the acceleration of the body of tractor 101 to correct for errors in the heading of tractor 101. The inertial measurement unit hardware 108 is rigidly affixed to the body of tractor 101 and measures linear and angular accelerations in 6-degrees of freedom. IMU processor task software 203 processes the output of inertial measurement unit 108 with filters and coordinates rotations prior to use by guidance task software 201.

A real-time operating system 206 coordinates the software tasks 201, 202, 203, 204, and 205, and ensures each task receives enough central processing unit 111/200 computation time, memory, and IO access. Operating system 116 may be a real-time operating system to ensure reliable operation regarding accurate time management and starts, stops, and communicates with the other software tasks and hardware. A number of real-time operating systems 206 may include VxWorks, Integrity, uC/OS-II, FreeRTOS, and others. Real-time operating system 206 is known to those skilled in the art and is therefore not described in further detail.

Memory 120 is coupled to one or more of processing units 107, 108, 109, 110, and 111 (referred to generally as processing units 115) and stores instructions that, when executed by processing units 115, cause processing units 115 to compute a geo-location of vehicle 101 based on the location data generated by GNSS receiver 109, operate one or more external communication interfaces 112 and 116, calculate a desired path for steering vehicle 101 based on the geo-location of vehicle 101, and communicate the desired path to one or more operating units 102 and 104 external from integrated computing system 106 via the one or more external communication interfaces 112 and 116, respectively.

In one embodiment, the one or more computer processing units 115 are coupled together and programmed to provide shared coordinated execution of software functions 201, 202, 204, 205, and 206 (referred to generally as software functions 210).

In one embodiment, computer processing units 115 and memory 120 are all implemented and located within a same integrated circuit. In one embodiment, computer processing units 115 may be implemented with one or more Field Programmable Gate Arrays (FPGA) or other programmable logic devices. In another embodiment, computer processing units 115 may be implemented with one or more Application Specific Integrated Circuits (ASICs). In another embodiment, computer processing units 115 may be implemented with one or more custom integrated circuits.

In one embodiment, one or more of external communication interfaces 112 and 116 may include a Controller Area Network (CAN) interface. In another embodiment, one or more of external communication interfaces 112 and 116 may include an Ethernet, WiFi, Wide Area Network (WAN), Bluetooth, Local Area Network (LAN), National Marine Electronics Association (NEMA) network, or any other network interface.

In one embodiment, memory 120 may store a predetermined path for vehicle 101 and the one or more computing processing units 115 may steer vehicle 101 along a desired path based on the predetermined path. In another embodiment, computer processing units 115 may receive a predetermined path over one of the external communication interfaces 116 from an external computing system, such as computer terminal 104 or a central server, and steer vehicle 101 along the desired path based on the receive predetermined path.

The one or more computer processing units 115 may calculate steering commands based on the calculated desired path and send the steering commands to steering controller/actuator 102 over external communication interface 112 to steer vehicle 101 along the desired path.

Figure 3:
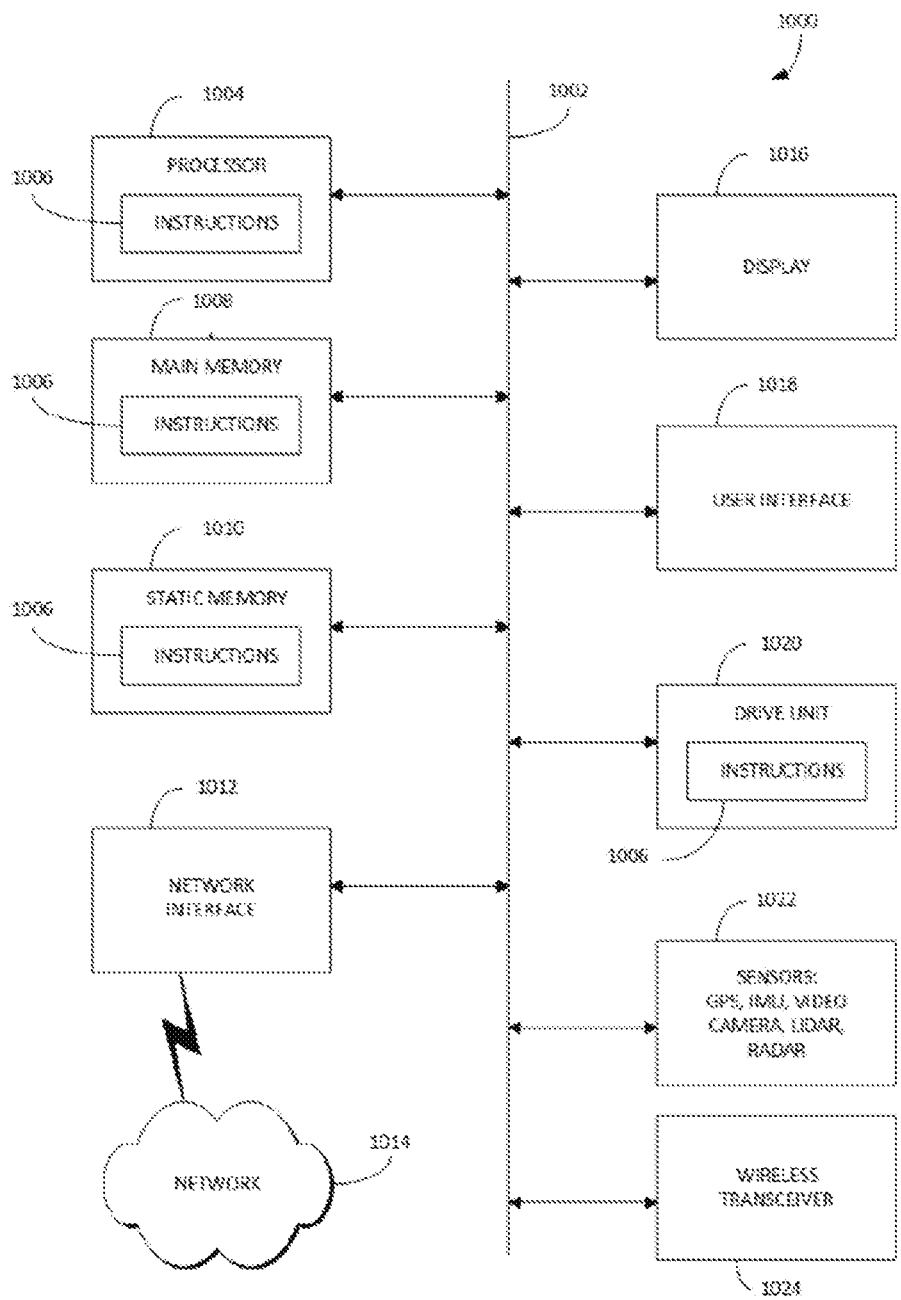
FIG. 3 shows an example computer system used in the integrated computer guidance system of FIG. 1 and FIG. 2.

FIG. 3 shows a computing device 1000 that may be used for implementing or operating integrated precision guidance unit 106. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, central processing unit, programmable logic device, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

Computing device 1000 may include any combination of sensors 1022 including, but not limited to, GSP, IMU, video camera, LIDAR, and radar. Computing device 100 also may include a wireless transceiver 1024 for wirelessly transmitting and receiving commands to and from other computing devices.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. An apparatus, comprising:
   an integrated vehicle guidance unit having an external interface, wherein the external interface includes a vehicle steering interface configured to communicate with a steering actuator and a network interface configured to communicate with a computer terminal;
   wherein the integrated vehicle guidance includes:
      an inertial measurement unit (IMU);
      guidance circuitry to operate a global navigation satellite system (GNSS) controller configured to control and exchange data with a GNSS receiver configured to receive position data from a GNSS radio antenna, wherein the guidance circuitry includes one or more local hardware processing resources coupled together and programmed to provide shared coordinated execution of software functions, the one or more local hardware processing resources to communicate without using the external interface; and a memory device coupled to the one or more local hardware processing resources including instructions stored thereon that, in response to execution by the one or more local hardware processing resources, cause the guidance circuitry to operate software functions including:

a steering controller configured to control and exchange data with the steering actuator through the vehicle steering interface; and an IMU controller configured to control and exchange data with the IMU;

wherein the guidance circuitry is arranged to host a steering algorithm corresponding to the steering controller and IMU conditioning corresponding to the IMU controller.

2. The apparatus of claim 1, wherein the software functions include a real-time operating system configured to control operation of the guidance controller, the steering controller, IMU controller, and the GNSS controller.

3. The apparatus of claim 1, wherein the guidance circuitry, and the one or more local hardware processing resources thereof, are all located within a same integrated circuit.

4. The apparatus of claim 1, wherein the guidance circuitry includes one or more Field Programmable Gate Arrays (FPGA) or other programmable logic devices.

5. The apparatus of claim 1, wherein the guidance circuitry includes one or more Application Specific Integrated Circuits (ASICs) or a custom integrated circuit.

6. The apparatus of claim 1, wherein guidance circuitry, including the one or more local hardware processing resources thereof, are all located within a same housing.

* * * * *